Nov. 23, 1965     B. R. EVERETT     3,218,899
MATERIAL HANDLING APPARATUS
Filed April 26, 1963     4 Sheets-Sheet 1
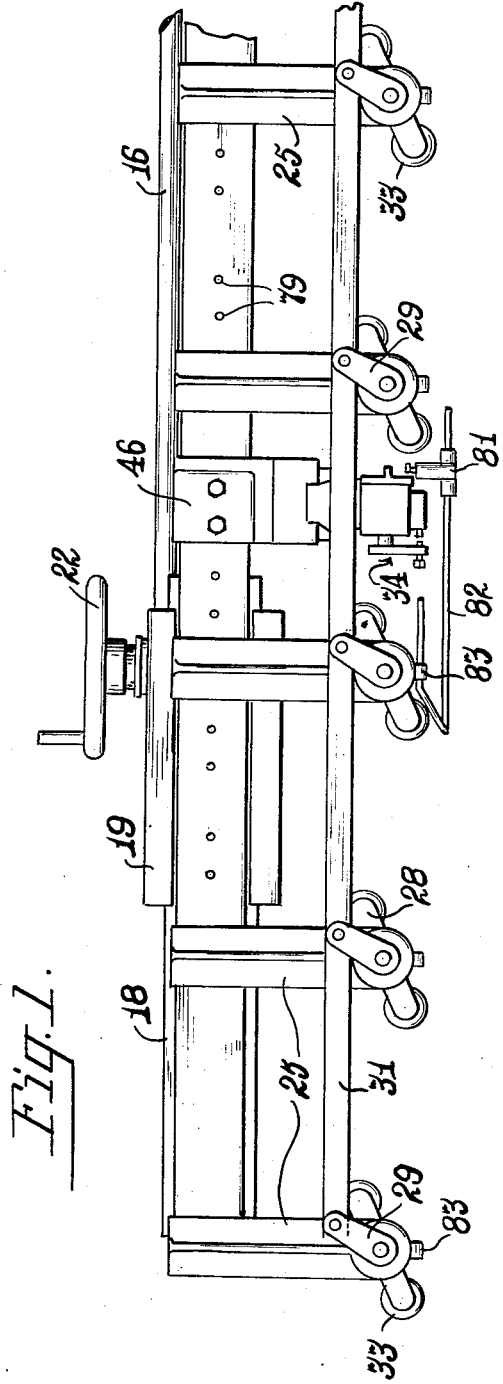
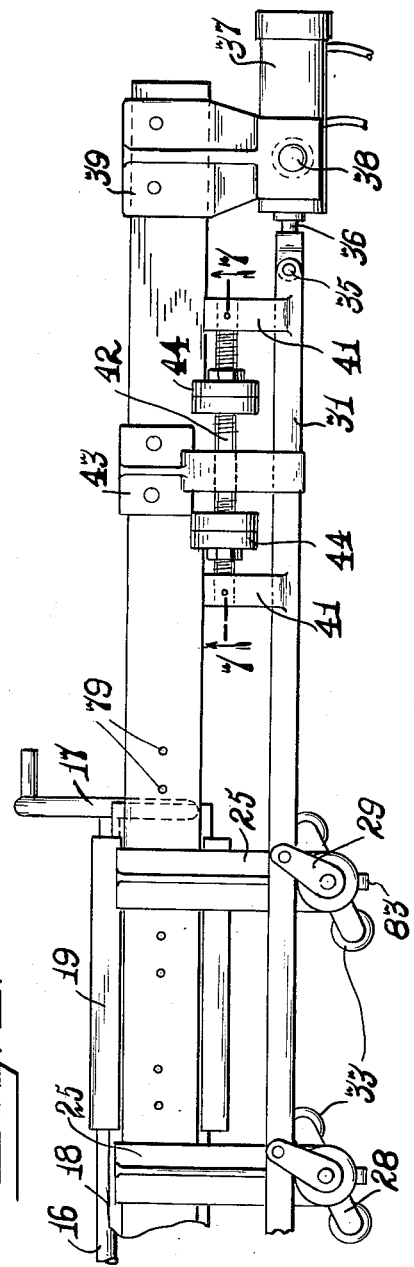
INVENTOR.
Buford R. Everett
BY
Charles H. Redman
Attorney.

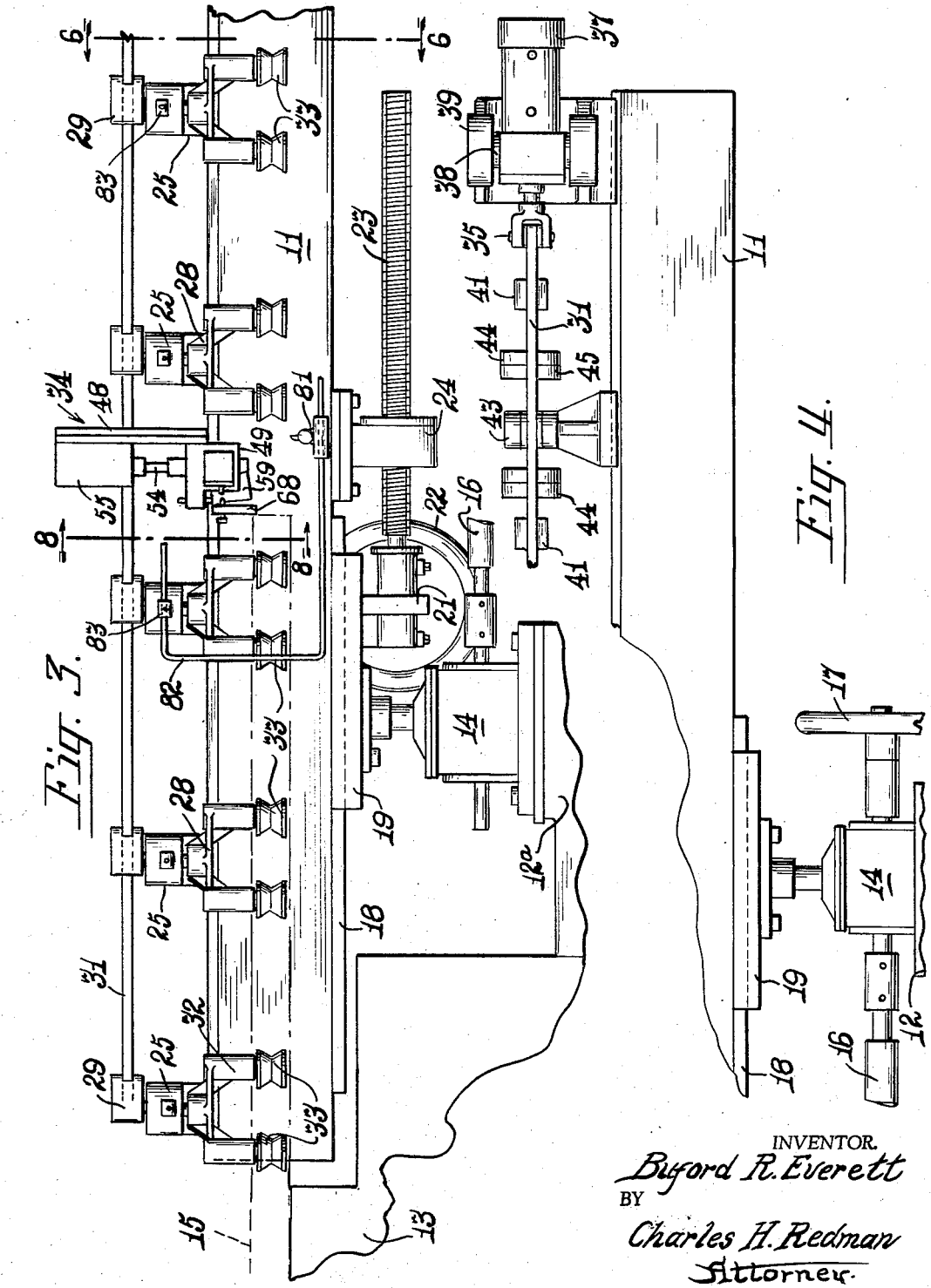

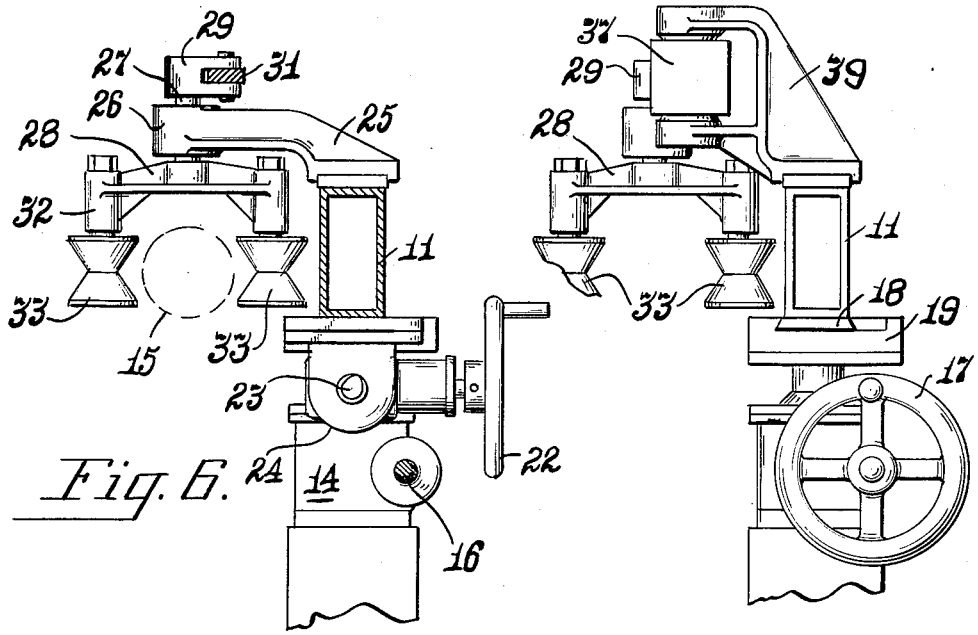
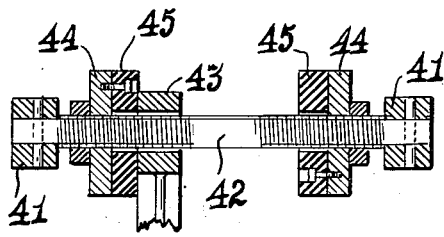
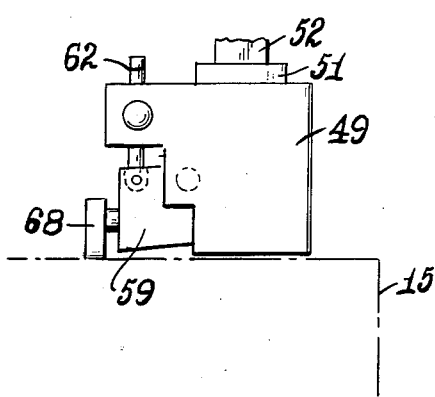
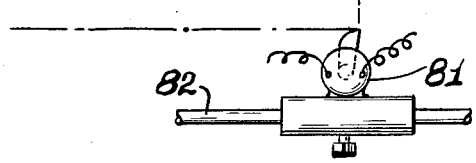

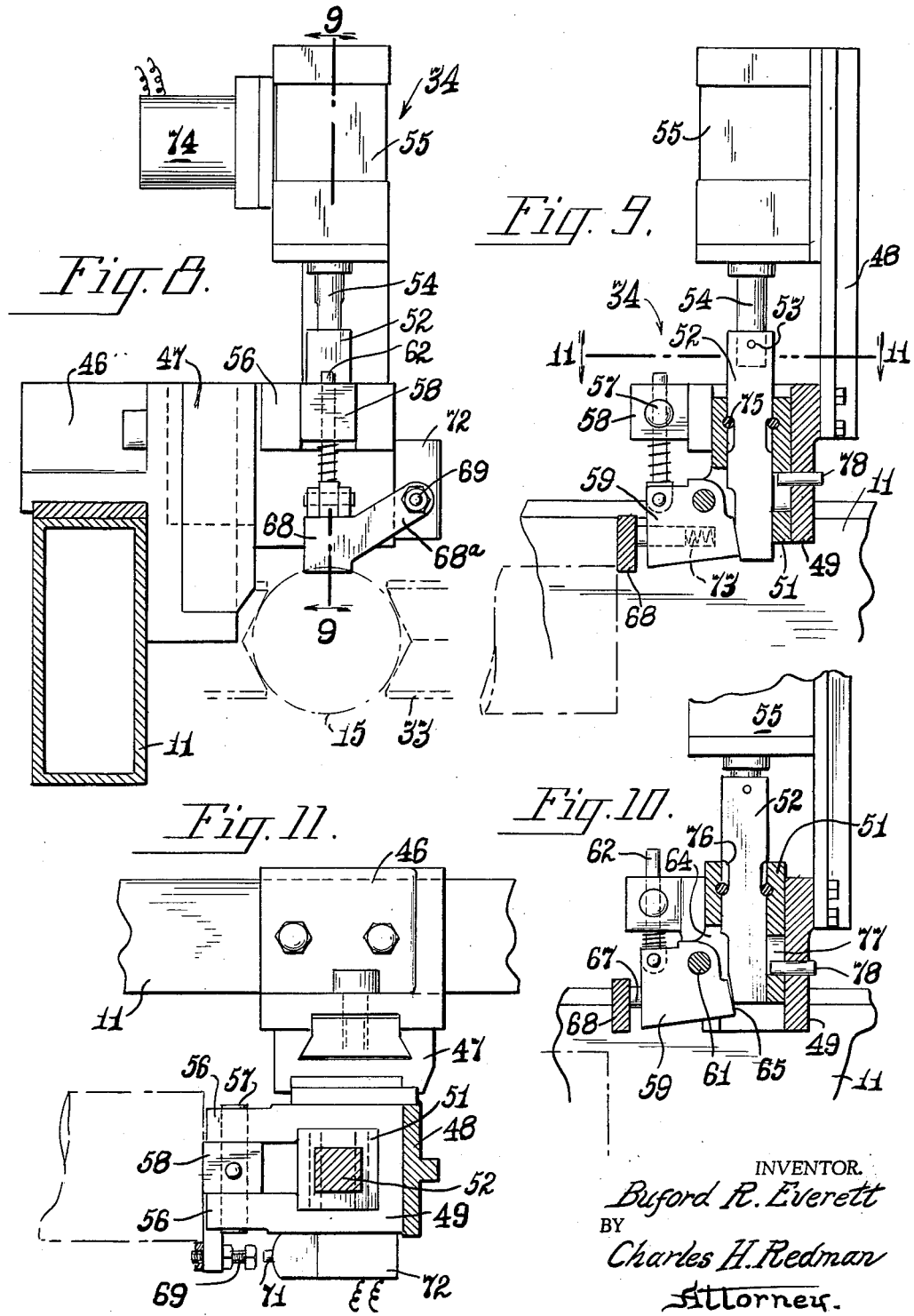

United States Patent Office 3,218,899
Patented Nov. 23, 1965

3,218,899
MATERIAL HANDLING APPARATUS
Buford R. Everett, Aurora, Ill., assignor to Pines Engineering Co., Inc., Aurora, Ill., a corporation of Illinois
Filed Apr. 26, 1963, Ser. No. 276,701
14 Claims. (Cl. 83—212)

The present invention relates to improvements in equipment for handling lengths of rod-like stock such as rods, bars, tubes, etc., and it is specifically concerned with apparatus for receiving and holding a predetermined portion of a length of rod-like stock thrust thereinto while said stock is being cut, by auxiliary apparatus, into predetermined lengths and, for releasing the severed portions quickly and automatically. The apparatus is further characterized in being vertically adjustable to adapt it to receiving lengths of stock of different diameters.

The apparatus is of considerable length and it includes an elongated bed frame that may be adjusted both horizontally and vertically as may be required for accurate determination of the length of the pieces to be severed and for aligning its working parts with stock being fed thereto from auxiliary apparatus, such as a stock cutting machine. The bed frame mounts a series of longitudinally spaced pairs of elements designed to embrace the stock between the elements of each pair and which are mounted in a manner to insure their quick embracing engagement and disengagement with the stock. Means, also adjustable on the bed frame, is arranged to be abutted by the leading end of the stock for limiting its advance into the apparatus, and which is operable by reason of such abutment to actuate switch means controlling the operation of auxiliary mechanisms.

It is, therefore, an object of the invention to provide a rugged apparatus of the character described.

Another object is to provide, in an apparatus of the character described, novel means to adjust same into stock receiving position.

Another object is to provide a novel arrangement of stock embracing elements and novel means to facilitate their actuation.

Still another object is to provide novel stock-actuated switch control means for the stock embracing elements.

Yet another object is to provide apparatus of the character described which is not expensive to manufacture and install, is simple and positive in its operation, and is very efficient in its use.

With the foregoing and such other objects in view, which will appear as the description proceeds, the invention consists of certain novel features of construction, arrangement and combination of parts hereinafter fully described, illustrated in the accompanying drawings, and particularly pointed out in the appended claims, it being understood that various changes in form, proportion, size and minor details of the structure may be made without departing from the spirit of the invention.

Referring now to the drawings in which the same characters of reference are employed to identify corresponding parts:

FIG. 1 is a plan view of one end portion of the apparatus;

FIG. 2 is a plan view of the other end portion of the apparatus;

FIG. 3 is a side elevational view of the portion of the apparatus shown in FIG. 1;

FIG. 4 is a side elevational view of the portion of the apparatus shown in FIG. 2, parts being broken away;

FIG. 5 is an elevational view of the right hand end of the apparatus as viewed in FIG. 4;

FIG. 6 is a vertical sectional view of the apparatus, taken substantially along line 6—6 of FIG. 3;

FIG. 7 is an enlarged detail sectional view of the limit means, taken along line 7—7 of FIG. 2;

FIG. 8 is a front elevational view of target-stop means, taken substantially along line 8—8 of FIG. 3;

FIG. 9 is a side elevational view of the target-stop means shown in FIG. 8, showing parts in section;

FIG. 10 is a view similar to FIG. 9, showing the parts in stock-release position; and, FIG. 11 is a horizontal sectional view taken along line 11—11 of FIG. 9.

FIG. 12 is another detail view of the target-stop means and proximity switch.

Referring to the exemplary embodiment of the stock handling apparatus disclosed in the accompanying drawings and particularly to FIGS. 1 to 4 thereof, the apparatus includes a horizontally disposed bed frame 11, preferably in the form of a heavy beam, which is mounted in an elevated position on suitable support 12 and 12a. The support 12a may be integral with the discharge end of auxiliary apparatus 13 such, for example, as a machine for cutting off portions of predetermined length from a length of rod-like stock. A jack mechanism 14 is interposed between the upper end of each support 12–12a and frame 11 so as to afford means whereby the frame may be raised or lowered to adapt the handling apparatus to receive the end portion of a length of stock 15 fed thereto from the auxiliary apparatus, not shown in detail, which may be a shearing machine. The auxiliary apparatus, which forms no part of the present invention, operates to feed a length of the stock 15 into the instant apparatus and to sever a portion therefrom. After the length of stock is cut, the severed portion is subsequently dropped, in a manner to be made apparent presently, to make room for receiving a successively fed portion of the stock. Preferably common means in the form of a shaft 16 and hand wheel 17 is provided for actuating jacks 14 in unison.

Also, for a purpose to be explained presently, the frame 11 is movable in a longitudinal direction relative to its supports 12, 12a. This is accomplished by providing a pair of slide plates 18 on the under side of the frame, each slidable in a bearing plate 19, one mounted on the upper end of each jack mechanism 14 and by providing means in the form of a gear box 21 fixed to one bearing plate 19 (FIG. 3) and which mounts a hand wheel 22 and a screw shaft 23, the latter being threaded through a bearing block 24 secured to frame 11. Obviously, manipulation of hand wheel 22 will cause the frame to shift in a longitudinal direction.

A plurality of upstanding standards 25 (best shown in FIG. 6) are secured firmly to and spaced apart longitudinally on the top surface of frame 11. Each of these standards overhangs a common side of the frame and each terminates in a head or vertical bearing boss 26 in which is freely journalled a stud shaft 27. The lower extending end of said shaft mounts firmly a bracket 28 whereas the upper extending end mounts firmly an arm 29. The arms 29 of the several assemblies are interconnected by a common bar 31 for a purpose to be explained presently. Each bracket 28 has its arms of equal length and terminating in a mounting boss 32, in each of which is secured for free rotation a roller 33. As shown, the rollers 33 are disposed below brackets 28 and are centrally concave and each pair of rollers on each bracket is adapted to receive between them a portion of the length of rod-like stock 15 when the latter is fed into the apparatus from the cutting machine.

The operation, insofar as the apparatus has been described, is substantially as follows: The elevation of the frame 11 is adjusted, if necessary, to insure that the rod-like stock to be advanced from the auxiliary apparatus 13, is properly aligned with the rollers 33. Obviously, the elevation must be varied to accommodate rod-like stock of different diameters. A length of such stock is then fed through the auxiliary apparatus 13 and it is advanced rapidly to locate a portion thereof of predetermined length between the rollers 33 of at least some of the pairs of rollers. The length of the portion of rod-like stock extending into the handling equipment and between the rollers is determined by the setting of target means generally shown at 34 and to be described presently. This setting determines the length of the rod-stock to be severed by the cutting mechanism in the auxiliary apparatus 13.

Now when the target means 34 is abutted by the end of the rod-like stock, control means is actuated in sequence to close clamp means in the auxiliary apparatus 13 for holding the rod-like stock firmly, de-energize the feed rolls in said apparatus, sever the rod-like stock, open the clamp means and then restart the feed rolls.

This sequence of operations in the auxiliary apparatus are accompanied by raising of the target means out of the path of the rod-like stock and, as the rod-like stock again advances, upon restarting of the feed rolls, it moves beneath the target means, as best shown in FIG. 12, and its lead end encounters a proximity switch 81 which, when actuated, actuates control means for rotating all of the brackets 28 in a direction to cause the rollers 33 to move apart thus releasing the cut piece of rod-like stock which now falls out of the apparatus. When the proximity switch is no longer engaged by the cut piece of rod-like stock, the rollers 33 return to their initial positions.

The means controlling the actuation of roller brackets 28 is best shown in FIGS. 2 and 4 where it will be seen that the end of the connector bar 31 is connected, as at 35, to the projecting end of a piston rod 36 forming a part of a piston-cylinder assembly 37 mounted pivotally, as at 28, in a bracket 39 secured to the right hand end of frame 11. Operation of the piston-cylinder assembly moves the rollers 33 into embracing and non-embracing positions quickly.

The length of the effective stroke of the piston-cylinder assembly 37 and, consequently, the distance the roller brackets 28 are rotated, is controlled by novel limit means best shown in FIGS. 2 and 7. As shown, the connector bar 31 has a pair of laterally extending spaced apart bosses 41 having a threaded rod 42 anchored in and bridging same. The rod slides freely through a yoke 43 secured to frame 11 and it carries, one on each side of said yoke, adjustable collars 44 each faced with a resiliently compressible cushion 45. When the bar 31 is shifted in either direction, one or the other of the cushioned collars 44–45, abuts yoke 43 to limit its movement. By adjusting the cushioned collars 44–45 along rod 42, the stroke of the piston rod is controlled and likewise the amount of opening and closing of the effective space between the rollers 33 of each pair of rollers is determined. In this manner the roller positions are adjusted to accommodate rod-like stock of different dimensions.

Referring now specifically to FIGS. 8 through 11, the target means 34 is supported on the frame 11 by a standard 46 including a vertically adjustable plate 47 having welded or otherwise secured to it an upstanding post 48 mounting a split housing 49 that is square in horizontal section. The split housing 49 has a square opening therein in which is slidably mounted a sleeve 51 and within which a plunger 52 reciprocates. The plunger 52 is connected, as at 53, to the projecting end of a piston rod 54 forming a part of a piston-cylinder assembly 55 mounted on post 48.

The housing 49 has a pair of spaced ears 56 between which is mounted pivotally, as at 57, a bearing block 58. Also mounted on split housing 49 is a rocker 59 which is rotatable about a horizontal axis 61 and which carries a plunger rod 62 that extends upwardly through a hole in bearing block 58. A spring 63 on said rod tends to urge the rocker 59 about its pivot counter-clockwise into a downwardly inclined position. As best shown in FIG. 9, the sleeve 51 is slotted, as at 64, to receive the rocker therethrough and the tail end 65 of said rocker normally abuts an inclined surface 66 on plunger 52 so as to hold rocker 59 in a substantially horizontal position. The opposed or leading edge of the rocker 59 is apertured to receive a stem 67 on a target element 68 which is disposed to lie in the movement path of the length of rod-like stock 15. The target element has a lateral upwardly extending arm 68a (FIG. 8) that carries an adjusting screw 69 arranged in alignment with switch button 71 (FIG. 11) of a normally open micro-switch 72 that is secured to housing 49. This micro-switch is connected in an electric circuit to control the clamping, cutting and feed rolls as noted hereinabove. When the target element 68 is abutted by the leading end of the length of stock 15, it is moved relative to rocker 59 against the action of a compression spring 73 to carry its arm 68a and contact screw 69 against switch button 71 to close switch 72. This actuates the auxiliary apparatus elements as aforesaid.

In order to attain high speed operation of the related apparatus, it is necessary, upon the completion of each cutting operation, to release the severed portion of the stock held by rollers 33 in order to clear the rollers for a successive feeding thereunto of a portion of the remaining piece of rod-like stock. Such quick release is effected by the structure and operation of plunger 52 and its surrounding sleeve 51. Still referring to FIGS. 8, 9 and 10, the piston-cylinder assembly 55 is actuated by a solenoid valve 74 that is electrically connected with the auxiliary or cutting machine. When the cutting operation is completed, this solenoid valve is actuated to admit a charge of fluid into the lower end of the cylinder-piston assembly 55 for momentarily elevating plunger 52. Initial movement of the plunger upwardly is free of sleeve 51. However, when a collar 75 on said plunger reaches the upper limit of its clearance groove 76 in sleeve 49, said sleeve is lifted a distance commensurate with the clearance afforded by a slot 77 into which projects a stop pin 78 on the housing. This dual movement carries the plunger 52 out of the path of rocker 59 and elevates the rocker. When this occurs, the rocker rotates in a counterclockwise direction while lifting the target element 68 clear of the stock whereupon switch 72 returns to open position thus restoring the initial condition of the auxiliary apparatus parts.

At this time, the rod-like stock is advanced beneath the target 59, which now rests on the upper surface thereof, as shown in FIG. 12, and into engagement with the proximity switch 81 closing same to actuate the roller control means 37 for opening the rollers 33 and releasing the cut portion. The proximity switch 81 is adjustably mounted on any one of the standards 25 selected to give proper timing to the operation. As shown by way of illustration, the switch 81 is adjustable along an arm 82 that is in turn adjustably secured in a boss 83 on one standard 25.

It should be evident that the operation of this apparatus is very rapid and the various components thereof are actuated very quickly so as not to impede the usual high speed feeding and cutting of lengths of rod-like stock into pieces of predetermined length. Accuracy in length measurement of the cut pieces is attained by the combination of adjustment of the frame 11 toward and away from the cutting apparatus 13 and by adjusting the positions of the proximity switch and the target means 34 along the frame, a series of mounting holes 79 being provided for the latter along frame 11.

As numerous possible embodiments may be made in the invention, and as many changes may be made in the embodiment above set forth, it is to be understood that all matters hereinbefore set forth or shown in the accompanying drawings are to be interpreted as illustrative and not in a limiting sense.

What I claim and desire to secure by Letters Patent of the United States is:

1. Apparatus for supporting an elongated work-piece comprising, in combination, an elongated frame, a plurality of brackets spaced along said frame, means mounting said brackets for oscillatable rotation on vertical axes, a pair of rollers depending from each bracket and adapted to receive the work-piece between them, means to rotate said bracket to carry the rollers of each pair of rollers into and out of embracing engagement with said work-piece, and means engageable by the work-piece and operable to actuate said bracket rotating means.

2. Apparatus for supporting an elongated work-piece comprising, in combination, an elongated frame, a plurality of brackets spaced along said frame, means mounting said brackets for oscillatable rotation on vertical axes, a pair of rollers depending from each bracket and adapted to receive the work-piece between them, means to rotate said brackets to carry the rollers of each pair of rollers into and out of embracing engagement with said work-piece, and means adjustably mounted on said frame for engagement by the work-piece to actuate said bracket rotating means.

3. Apparatus for supporting a length of rod-like stock comprising, in combination, an elongated frame, support means for said frame, said frame being vertically and horizontally adjustable relative to said support means, a plurality of rollers supported on said frame, said rollers being arranged in pairs, brackets each mounting a pair of rollers, said brackets being rotatably adjustable for moving the rollers of each pair for alternately embracing and releasing a length of rod-like stock extended therebetween, and means operable to move said brackets.

4. Apparatus for supporting a length of rod-like stock comprising, in combination, an elongated frame, support means for said frame, said frame being vertically and horizontally adjustable relative to said support means, a plurality of rollers supported on said frame, said rollers being arranged in pairs with the rollers of each pair movable for alternately embracing and releasing a length of rod-like stock extended therebetween, means operable to move said rollers, and means responsive to the presence of a length of rod-like stock between said rollers operable to actuate the roller moving means.

5. The apparatus recited in claim 4, in which the means operable to move said rollers is a reciprocable motor and the means to actuate same comprises pressure responsive means.

6. The apparatus recited in claim 4, in which the pairs of rollers have a common connector and the means operable to move the rollers is operably connected to said connector.

7. The apparatus recited in claim 4, in which the means to actuate the roller moving means is adjustable longitudinally along the frame.

8. Apparatus for supporting a length of rod-like stock comprising, in combination, a horizontal frame, support means for said frame, a plurality of standards longitudinally spaced along said frame and extending laterally on one side of said frame, a bracket pivotally mounted in each standard for rotation in a horizontal plane, a pair of rollers journalled on and depending from each bracket, said brackets being movable about their pivots to carry the rollers of each pair into and out of embracing engagement with a length of rod-like stock extending between them, and means connecting said brackets for rotating them in unison.

9. Apparatus for supporting an elongated piece of rod-like stock comprising, in combination, an elongated horizontally extending frame, support means for said frame, means to adjust said frame vertically and horizontally, a plurality of standards longitudinally spaced along said frame, said standards having head portions disposed laterally of said frame, a bracket pivotally mounted in each head portion for rotation in a horizontal plane, a pair of rollers journalled on and depending from each bracket, said brackets being movable about their pivots to carry the rollers of each pair into and out of embracing engagement with an elongated piece of rod-like stock extending between them, means connecting said brackets for rotation in unison, and means operable to move said brackets about their pivots.

10. The apparatus recited in claim 9, in which means is provided to actuate said bracket moving means.

11. The apparatus recited in claim 9, in which switch means operable in response to the presence of a length of rod-like stock between the rollers is provided to actuate the bracket moving means.

12. The apparatus recited in claim 9, in which means engageable by the stock is provided for actuating the bracket moving means.

13. The apparatus recited in claim 9, in which the means operable to move said brackets about their pivots comprises a piston-cylinder assembly.

14. Apparatus for supporting an elongated work-piece comprising, in combination, an elongated frame, a plurality of brackets spaced along said frame, means mounting said brackets for oscillatable rotation on vertical axes, a pair of rollers on each bracket and adapted to embrace the work piece between them, means to rotate said brackets to carry the rollers of each pair of rollers into and out of work piece embracing engagement, and actuating means for said means responsive to engagement by a work piece with said actuating means, said actuating means being adjustable along said frame.

References Cited by the Examiner

UNITED STATES PATENTS

| | | | |
|---|---|---|---|
| 2,389,556 | 11/1945 | Siegerist. | |
| 2,572,137 | 10/1951 | Grieder | 83—372 X |
| 3,001,680 | 9/1961 | Nitkiewicz | 226—199 X |
| 3,009,617 | 11/1961 | Brown | 226—177 X |
| 3,072,309 | 1/1963 | Hill | 226—196 X |
| 3,118,635 | 1/1964 | Landsem | 226—177 X |

WILLIAM W. DYER, Jr., *Primary Examiner.*

WILLIAM S. LAWSON, *Examiner.*